FIG.2

April 12, 1932.   E. J. TUCKER   1,853,289
MAT WEAVING MACHINE
Filed April 29, 1931   5 Sheets-Sheet 5

INVENTOR
ELA J. TUCKER
BY A. B. Bowman
ATTORNEY

Patented Apr. 12, 1932

1,853,289

UNITED STATES PATENT OFFICE

ELA J. TUCKER, OF EL CAJON, CALIFORNIA

MAT WEAVING MACHINE

Application filed April 29, 1931. Serial No. 533,602.

My invention relates to mat weaving machines and the objects of my invention are:

First, to provide a machine of this class which is particularly adapted for weaving or sewing tule, bulrushes, reed, bamboo or any similar species of grass;

Second, to provide a machine of this class which is particularly economical of operation and arranged to weave or sew grasses such as tule or bamboo without requiring trimming or other previous preparing of the material whereby the cost of the completed mat is extremely low;

Third, to provide a machine of this class which produces a mat of such extremely economical construction that the mat is suitable for uses heretofore impractical because of cost, such as shelters for young trees, vines, shrubs or other plants requiring protection from frost, sun, wind, etc.; roofs for hay or the like, barns, sheds, etc.; or if desired may be used to form complete chicken or poultry sheds of such cheap construction that they may be burned periodically so as to destroy any vermin.

Fourth, to provide a machine of this class in which all of the driving or operating mechanism is arranged below the table which receives the mat material;

Fifth, to provide a machine of this class which automatically segregates a bundle of mat material into small sections so as to facilitate the sewing or weaving thereof;

Sixth, to provide a machine of this class which automatically rolls the complete mat into convenient bundles;

Seventh, to provide a machine of this class in which the parts are so arranged that it is practically impossible to injure the machinery from deleterious matter passing therethrough with the mat material;

Eighth, to provide a machine of this class which is particularly adapted for using wire to weave the mat material, although being capable of weaving with cord or thread;

Ninth, to provide a machine of this class in which the feeding mechanism as well as the mat collecting mechanism may be arranged on an incline so that the receiving end as well as the discharge end of the machine is lower than the sewing or weaving portion thereof, thereby facilitating the loading of mat material upon the machine as well as the removing of the complete mat;

Tenth, to provide a machine of this class which can readily be mounted upon a truck or other vehicle so as to be moved from place to place where the weaving material may be had, or where it is desired to use the completed mat thus simplifying the transportation problem; and Eleventh, to provide on the whole a novelly constructed mat weaving machine which is durable, efficient in its action, simple of construction, and which will not readily deteriorate or get our order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Similar characters of reference refer to similar parts and portions throughout the several views of the drawings.

Main supporting girders 1, main beam members 2, cross beam members 3, bracket members 4, weaving unit outer retaining rollers 5, weaving unit inner retaining rollers 6, weaving helices 7, bobbins 8, bobbin shafts 9, friction disks 10, non-rotating disks 11, tension springs 12, tension adjusting nuts 13, driving drum 14, beveled pinion gears 15, beveled driving gears 16, main drive shaft 17, frame members 18, table 19, feeding mechanism drive shaft 20, frame members 21, table 22, feeding screws 23, kicking wheels 24, bevel gears 25, sprocket and chain means 26, auxiliary feeding conveyors 27, shaft 28, conveyor drive mechanism 29, trimming or knives 30, sprocket and chain arrangement 31, conveyor frame members 32, conveyor shaft 33, foot members 34, supports 35, shaft 36, cross member 37, brace members 38, pulleys 39 and 40, conveyor belts 41, pulleys 42, conveyor belts 43, brackets 44, and retaining lattice 45 constitute the principal parts and portions of my novel mat weaving machine.

The machine is mounted on two or more main supporting girders 1 which extend transversely with the machine and may be mounted up on a truck or other suitable vehicle, not shown. Mounted across the main supporting girders 1 in parallel spaced relation with each other and extending longitudinally with the weaving machine are a plurality of main beam members 2. The forward ends of these beam members terminate over one of the main supporting girders 1 and are connected along the upper side of this end by a cross beam member 3. Supported from the cross beam member 3 by their one ends in staggered relation to the main beam members 2 are a plurality of bracket members 4 which extend rearwardly.

Figure 3:
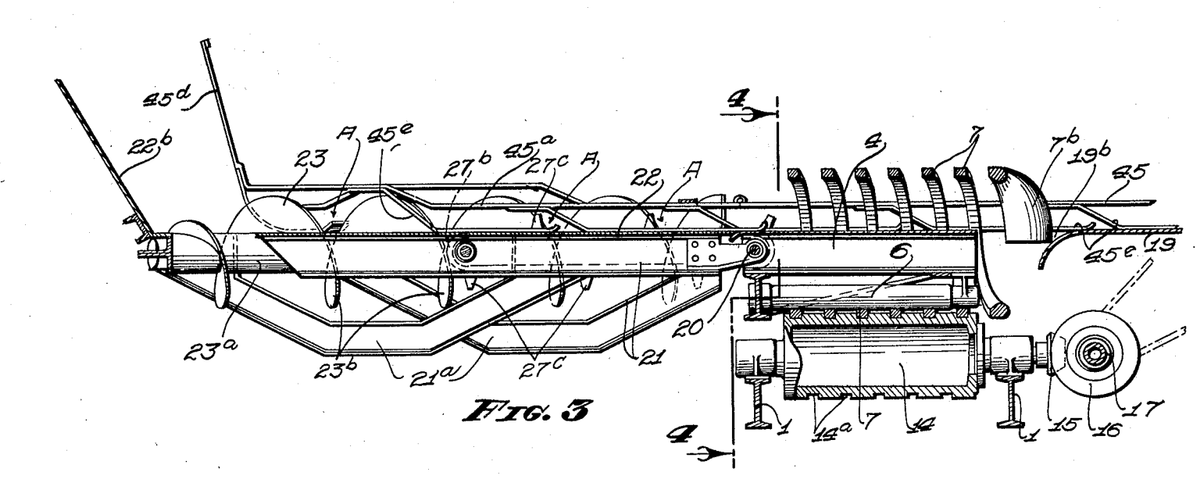
Fig. 3 is a fragmentary longitudinal sectional view taken through 3—3 of Fig. 1 with parts and portions as shown in elevation.
Figure 4:
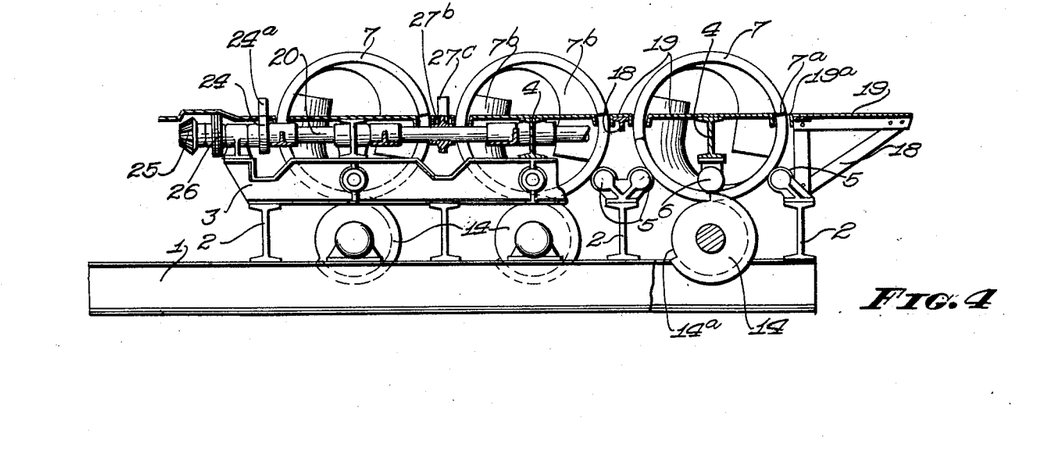
Fig. 4 is a transverse sectional view taken through 4—4 of Fig. 1 with parts and portions as shown in elevation.
Figures 5, 6:
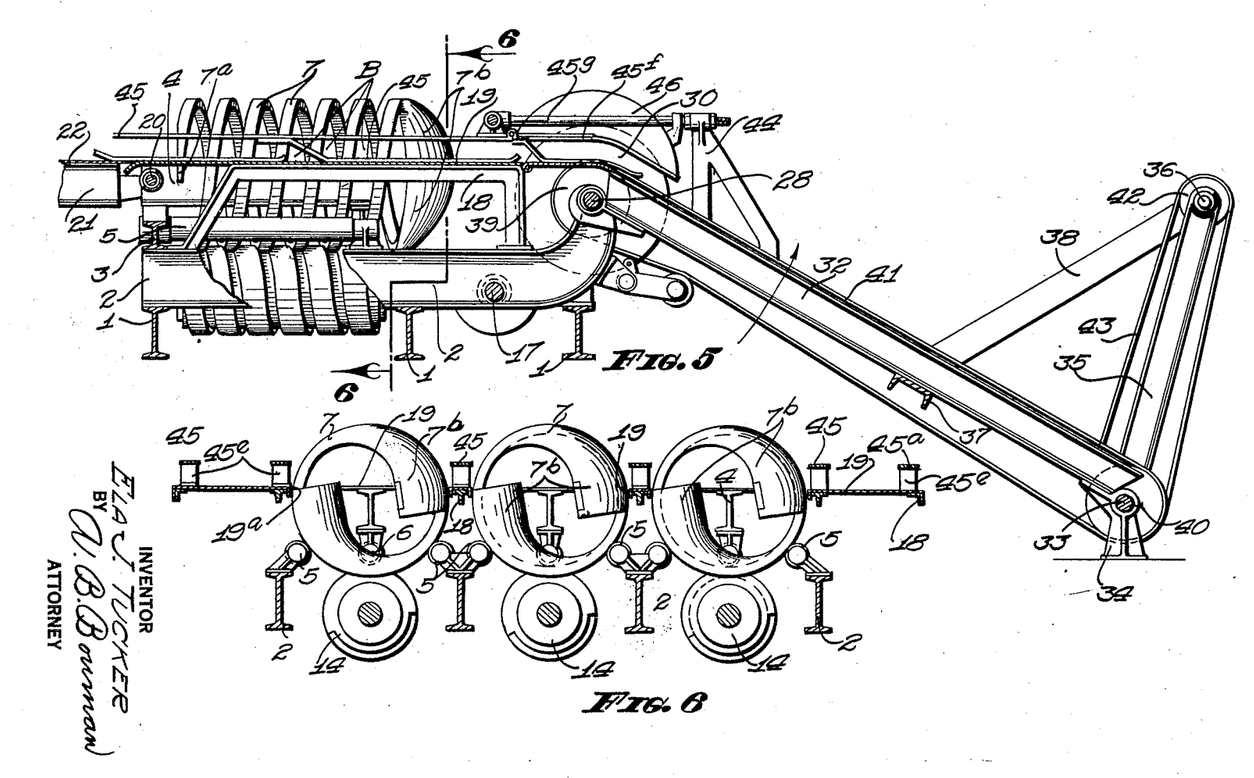
Fig. 5 is a fragmentary longitudinal sectional view taken through 5—5 of Fig. 2 with parts and portions as shown in elevation.
Fig. 6 is a transverse sectional view through 6—6 of Fig. 5 with parts and portions as shown in elevation.

Supported by or formed in the main beam members 2 and cross beam member 3 are pairs of bearing members which are adapted to rotatably support weaving unit outer retaining rollers 5 which extend longitudinally with the main beam members at their upper sides in offset relation therewith as shown best in Figs. 3, 4, and 6. There are provided two retaining rollers 5 for each weaving unit.

Figure 1:
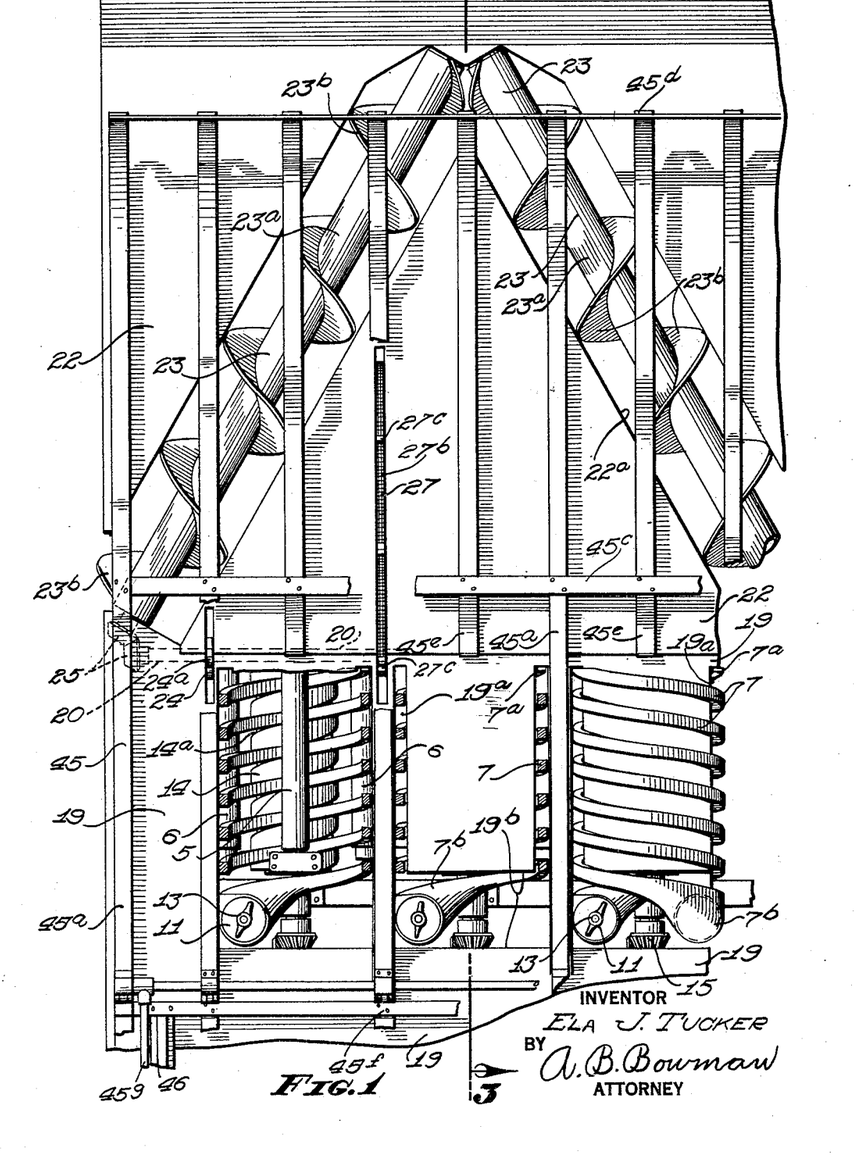
Figure 1 is a fragmentary plan view of the forward or receiving portion of my mat weaving machine with parts and portions as shown in sections to facilitate the illustration.

Each bracket member 4 is adapted to support thereunder an inner retaining roller 6 as shown best in Figs. 1, 3, and 4. There is provided one inner retaining roller for each weaving unit.

Each weaving unit comprises two indentically constructed weaving members in the form of helicoids, preferably having several convolutions. The outer peripheries of each helicoidal weaving member has a constant diameter. The convolutions of each weaving member are separated, so that the convolutions of the two weaving members of each weaving unit may be arranged in alternate spaced relation whereby the corresponding portions of the two weaving members are located 180° apart. Thus each weaving unit is in the form of a double pitch screw. Each weaving unit is adapted to rest upon the outer rollers 5 being retained thereon by the inner rollers 6.

The convolution end of each weaving member terminating at the forward end thereof tapers to a dull edge arranged substantially radially and forms a finger portion 7a.

Figures 7, 8, 9, 10, 11:
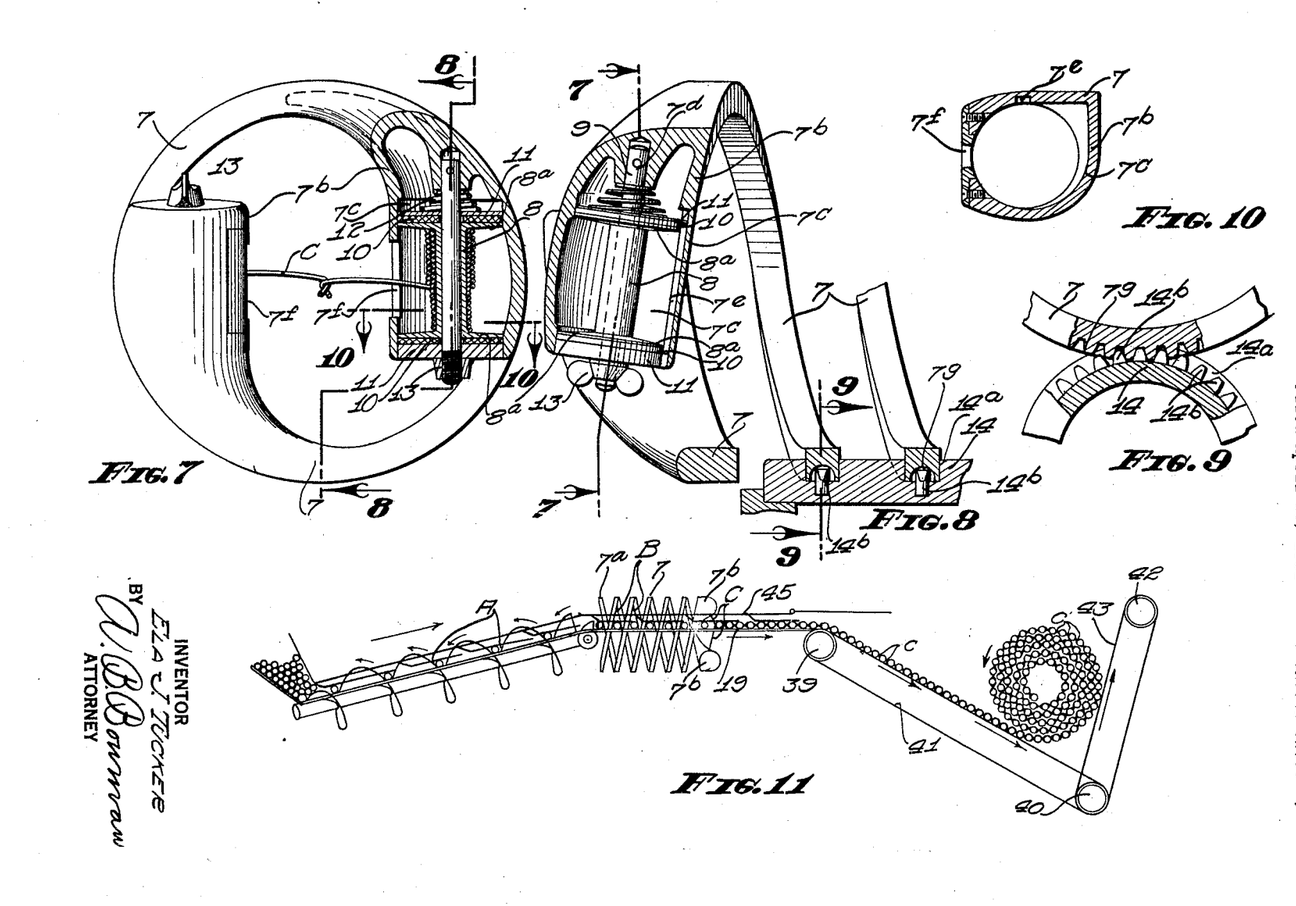
Fig. 7 is an enlarged partial elevational view of one of the mat weaving units taken through 7—7 of Fig. 8.
Fig. 8 is an enlarged fragmentary longitudinal sectional view thereof taken through 8—8 of Fig. 7 showing in connection therewith a fragmentary portion of the driving means and the means of interlocking the weaving units with the driving means.
Fig. 9 is a fragmentary sectional view through 9—9 of Fig. 8 showing the interlocking means between the driving means and the weaving units, (this interlocking means being omitted in the other views with the exception of Fig. 8 in order to facilitate the illustration)
Fig. 10 is a transverse sectional view through 10—10 of Fig. 8 with the bobbin removed.
Fig. 11 is a diagrammatical view of my mat weaving machine illustrating its mode of operation.

The rear convolution of each weaving member 7 terminates in a hollow enlargement 7b, the outer surface of which follows the normal periphery of the weaving member while the axially rearward side and radially inner side are extended as shown best in the enlarged views, Figs. 7, 8, and 11.

The enlargement 7b of the weaving member is open at the extremity of the member forming a bobbin receiving socket 7c adapted to receive a bobbin 8 having annularly flanged ends 8a which define a cylinder. The bobbin receiving socket is adapted to receive the bobbin by insertion through the open end thereof. The socket 7c conforms in part to the periphery of the cylinder defined by the flanges of the bobbin. The remaining inner walls of the socket are spaced outwardly from the cylinder so defined that the outer surface of the enlargement 7b may have the desired configuration without necessitating an undue amount of material.

Axially centered with respect to the cylindrical portions of the socket 7c is a shaft 9 which is anchored at its inner end in a boss 7d formed within the socket 7b. The bobbin 8 journals upon this shaft. In order to control the effort needed for rotation of the bobbin, there are provided friction disks 10 which bear against the outer sides of the flanges 8a. The friction disks are in turn engaged by non-rotating disks 11 which surround the shaft 9.

The non-rotating disks 11 are provided by tongues or projections in their peripheries which are adapted to fit in a channel or groove 7e formed in the cylindrical portion of the socket 7c. A tension spring 12 surrounds the shaft 9 between the boss 7d and the innermost non-rotating disk 11. The outer end of the shaft 9 is screw threaded and adapted to receive a tension adjusting nut 13 in the form of a wing nut.

The radially inward wall of the socket 7c is provided with a slot 7f which extends axially with respect to the bobbin 8. The wall of the enlargement 7b may be provided with a removable section surrounding the slot 7f to facilitate replacement as the wire or cord wound on the bobbing 8 is drawn through this slot.

Each weaving unit is rotated by a driving drum 14 which is provided with a helically formed channel 14a. The diameter of the drum at the base of this helical channel 14a is exactly one-half the outside diameter of the weaving unit. The channel 14a is therefore arranged so that its adjacent convolutions receive the contiguous convolutions of the two weaving members forming the weaving unit. Hence the channel 14a is a single pitch screw whereas the weaving unit comprising the two weaving members forms a double pitch screw. The outer periphery of each weaving member is provided with a plurality of spaced apart depressions forming teeth 7g therebetween. The teeth 7g are adapted to mesh with corresponding teeth 14b which may be in the form of pins projecting upwardly from the base of the channel 14a. This arrangement eliminates any projecting teeth on the weaving members which might catch the material being woven thereby.

The driving drums are constructed shorter than the weaving units because of the tapered finger portions 7a and enlargements 7b. Each driving drum is constricted at its ends forming stub shafts adapted to journal in bearings which are mounted on the adjacent main supporting girders 1, as shown best in Figs. 3, 4, and 5. The rear stub shaft of each drum is adapted to receive a beveled pinion gear 15 adapted to mesh with a beveled driving gear 16 mounted on a main driving shaft 17 arranged at right angles to the axis of the driving drums 14 and associated with the main beam members 2.

Arranged upon each main beam member 2 are frame members 18 which extend to the level of the bracket members 4. The bracket members 4 and frame members 18 are adapted to support a table 19 which is provided with U-shaped slots including leg portions 19a adapted to receive the convolutions of the weaving unit and a cross portion 19b of greater extent arranged to clear the enlarged rear ends 7b of the weaving unit as shown best in Fig. 1.

A feeding mechanism driving shaft 20 is supported in bearings provided in the forward ends of the bracket members 4 so as to extend across the weaving machine just forwardly of the weaving units and above the cross beam member 3 as shown best in Figs. 3 and 4. The shaft 20 likewise forms a hinge pin about which the framework supporting the feeding mechanism may be arcuately adjusted. This framework comprises longitudinally extending frame members 21 which journal at their one ends on the shaft 20 and which support upon their upper sides a table 22. The table 22 of the feeding mechanism extends substantially flush with the table 19 of the weaving mechanism so as to avoid catching upon mat material passing thereover.

Suitably supported by the framework 21 are a pair of feeding screws 23 which diverge rearwardly towards the weaving mechanism. Each feeding screw 23 projects partly above the frame of the table 22, said table being provided with suitable slots 22a. Each feeding screw comprises a tubular shank or core 23a which may be of relatively light construction around which is helically wound a thin fin 23b. The fins 23b of the two preceding screws diminish in height towards their forward ends so that said forward ends of the screws may terminate in adjacent relation as shown best in Fig. 1.

The pitch of the feeding screws are right and left; further, the pitch of each screw is so arranged that upon rotation thereof in such a manner that the portions of the fins 23b projecting above the table 22 rotate outwardly when the screw feeds rearwardly as indicated by the arrows in the several views. The manner of operation of the feeding screws will be described in more detail hereinafter.

In order to clear the feeding screws, certain ones of the frame members 21 are provided with hanger portions 21a which pass under the feeding screws as shown in Fig. 3 enabling the feeding mechanism to be supported from the shaft 20 in a unit.

The rearward ends of the feeding screws 23 extend on the outer sides of the outer weaving unit so that the rearward extremities of the conveyors operate as close to the forward ends of the weaving units as possible. By reason of the shaft 20 there is a slight space. To bridge this gap there are boosting or kicking wheels 24 provided on the shaft 20 at the outer sides of the outer weaving unit. Each wheel 24 is provided with a projection 24a adapted to receive the mat material from the conveyors and move it far enough to permit engagement thereof by the forward ends or fingers 7a of the weaving units.

The feeding screws or conveyors 23 are driven by means of the shaft 20 through bevel gears 25 located at the outer ends of the shaft 20 and rearward ends of the screw members 23 as shown by dotted lines in Fig. 1. The shaft 20 is driven through a sprocket and chain means 26 from the main drive shaft 17.

In order to assist the action of the feeding screws 23 and kicking wheels 24, there may be provided one or several chain conveyor structures 27 which comprise a driving sprocket wheel mounted on the shaft 20, a second sprocket wheel mounted on a shaft 27a supported by the frame members 21, and a chain 27b passing around these sprocket wheels equipped with suitable lugs or fingers 27b adapted to engage the mat material. The fingers 27c may be similar to the kicking lugs 24a on the wheels 24 and operate simultaneously therewith in bridging the gap between the conveyor screws 23 and weaving units.

Mounted at the rear end of the weaving mechanism is a discharging and rolling mechanism as well as saws for trimming the mat.

Figure 2:
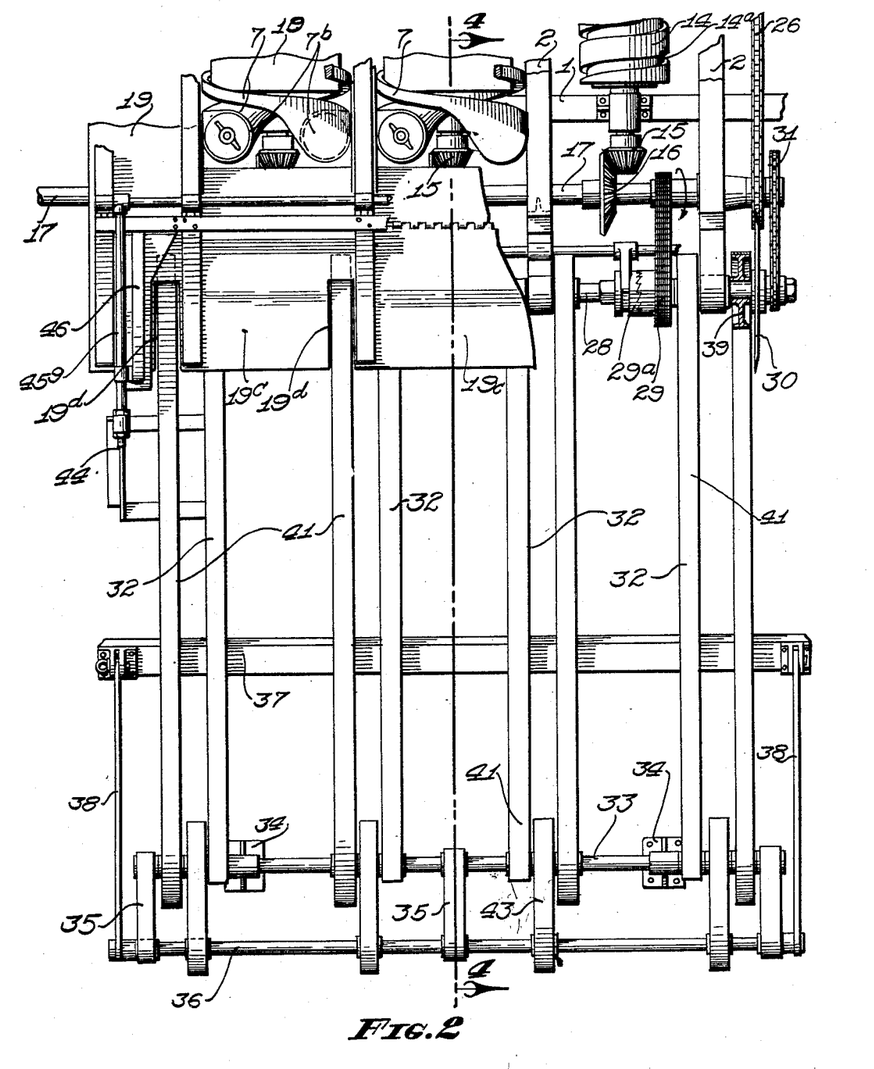
Fig. 2 is a continuing plan view illustrating the rear or discharge portion of my mat weaving machine with parts and portions as shown fragmentarily and in sections to facilitate the illustration.

A shaft 28 is supported by upturned rear end portions of the main beam members 2 as shown best in Figs. 2 and 5. This shaft is driven through a suitable conveyor drive mechanism 29 which also includes a suitable clutch mechanism 29a of any desirable construction adapted to permit the discharging mechanism to be disconnected from the remaining mechanism of the machine while the machine is running.

Rotatably mounted upon the outer ends of the shaft 28 are saws or rotary cutting knives 30 which are driven independently of the shaft 28 by means of a suitable sprocket and chain arrangement 31 connected with the main drive shaft 17. This enables the saws or knives to rotate with a higher speed than is required of the shaft 28.

Journaled upon the shaft 28, are conveyor frame members 32 which extend in parallel disposed relation and in turn support at their extended ends a conveyor shaft 33. Joined to the extremities of certain frame members 32 or the shaft 33 are foot members 34 adapted to rest upon any suitable base as shown in Fig. 5 so as to support the extended portions of the conveyor structure. Journaled upon the shaft 33 and normally extending upwardly therefrom are support members 35 which support at their extended upper ends a shaft 36.

The frame members 32 are connected intermediate their ends by a cross member 37. The shaft 36 supports the one ends of the brace members 38 which are removably connected to the cross member 37 so as to retain the supports 35 in fixed angular relation with the frame members 32.

Pulleys 39 and 40 are mounted on the shafts 27 and 33 around which pass conveyor belts 41. Similarly pulleys 42 are mounted on the shafts 33 and 36 around which pass other conveyor belts 43.

Extending upwardly from the outer frame members 32 clear of the mat after the mat has been trimmed by the knives 30 are bracket members 44. These bracket members are adapted to hold a retaining lattice structure designated 45 against axial shifting. The retaining lattice structure 45 comprises relatively thin main strips 45a of material which extends in parallel spaced relation with each other between the several weaving units and on the outer sides thereof as shown best in Figs. 1, 3, and 5, and partially in Fig. 2. Forwardly of the weaving unit there are provided additional retaining strips supported at their rear ends just forwardly of the weaving units by a cross member 45c connected to the main retaining strips 45a. The auxiliary or added retaining strips 45b are similar to the main retaining strips 45a except for their length. The retaining strips are offset upwardly so as to clear the fins 23b of the conveyors whenever they cross the feeding screws.

At their forward ends, each retaining strip is upturned so as to form the rearward wall 45d of a hopper structure. A forward wall of the hopper structure is formed by upturning the table 22 as indicated by 22b.

The retaining strips themselves may rest upon the tables but it is preferred in order to facilitate their function to provide a plurality of retaining springs under each retaining strip. Each retaining spring 45e is in the form of a leaf spring secured to its respective retaining strip at its forward end and free at its rear extremity as shown best in the sectional views of Figs. 3 and 5. These retaining springs begin and end as close to the margins of the feeding screws 23 as possible so that at all times the mat material is maintained in place.

The rear portion of the table 19 is in the form of an apron 19c hinged to the main portion of the table so as to rest over the beginning end of the conveyor mechanism. This apron 19c is provided with slots 19d which clear the conveyor belt. The apron 19c may be supported upon the ends of the frame members 32. Likewise the rear extremity of the retaining lattice 45 may be provided with a hinge portion 45f. This hinge portion 45f may support a pair of hood members 46 for inclosing the knives 30. By reason of the hinge portion 45f it is preferred to support the lattice work by extending rods 45g from the main portion of the retaining lattice to the brackets 44. These rods 45g also serve to maintain the hinge portion 45f of the retaining lattice in its proper position.

The purpose of hinging the apron 19c and the rearward portion of the retaining lattice 45f and for rotatably mounting the frame member 32 and supports 35 upon their respective shafts, is to enable the discharge conveyors to be folded and turned up over the weaving mechanism when the machine is not in use. This is also true of the feeding mechanism.

It can be seen that this arrangement enables the weaving machine to be mounted on a truck or vehicle so as to be transported.

This is particularly desirable as it is more economical to weave the mats at the farm or other place where the mats are to be used so as to reduce the expense of hauling the mats and raw material.

Operation of my mat weaving machine is as follows: My mat weaving machine is particularly adapted for weaving any species of grass having the proper length and strength, hence the machine may form into a mat any suitable local raw material. This may even include willow branches or similar material. At any event, whichever material is used, it is preferably of a length greater than the width of the machine and small enough in diameter to fit between the adjacent convolutions of the weaving units.

The mat material is placed lengthwise in the hopper formed by the walls 22b and 45d, whereupon the feeding or conveyor screws 23 draw out small bunches of the mat material, or if the raw product is relatively large in diameter only one stock or branch may be withdrawn.

The bundle rests between the V-shaped portions designated A, formed by the rising and descending portions of adjacent convolutions of the conveyor screws 23 as shown in Fig. 3 and in the diagrammatical view Fig. 11. These bundles are spaced a considerable distance apart by the conveyors so that the lugs or fingers 27c of the auxiliary cleaning conveyor 27 may rise to an operating position between the various bundles. By reason of the fact that the screw conveyors 23 diverge towards the rear portion of the machine and are likewise arranged so that their upper or conveying portions turn outwardly from each other, they tend to strip the bundles of mat material straightening out crooked pieces.

Each bundle as it leaves the ends of the screw conveyors 23 is shifted into the forward ends of the weaving unit by means of the kicking wheels 24 and auxiliary conveyors 27 so as to be simultaneously caught by the fingers 7a of the several weaving members. The weaving units are so timed that the forward ends of the weaving member pass forwardly of each bundle so as to trap the bundle in the spaces designated B in Figs. 5 and 11. Once in the spaces B the bundles of mat material are held in positively alined relation, and are fed rearwardly until they reach the rear sides of the enlargements 7b.

These rear sides of the enlargements 7b increase the rearward movement of the bundles and tend to press them against the previous bundles. Each bundle as it passes the enlargements 7b is engaged on opposite sides by pairs of wires from the two bobbins of each weaving unit. These wires are shown fragmentarily in Fig. 7 and designated by the character C. The bundle enters between the wires during the interval in which the weaving unit is at right angles to the position illustrated in Figs. 6, and 7; and whereupon, during the succeeding quarter revolution, the bundle is pushed forward into the wedges formed by the pairs of wires of the several weaving units and at the same time the wires are being twisted. By the time one bundle has cleared the weaving unit and the succeeding bundle is about to pass between the enlargement 7b, the wires have been given a half twist. Thus for each half revolution of the weaving unit one bundle of mat material is woven; hence, each wire passes under and over succeeding bundles of mat material at the same time forming a half twist with the other wire of the weaving unit. It can be seen that such a stitch as this firmly secures the bundles of mat material together.

Should the feeding of the mat material be irregular and gaps be formed between the adjacent bundles, the wire members of each pair merely twist about each other until the succeeding bundle passes between the discharge ends of the weaving members. This twisting of the wire is utilized to divide the mat into units. After the mat has reached the desired length no more material is fed in until the wire has been twisted a sufficient number of times to insure against possibility of untwisting. Later the mats are separated at these points.

After leaving the weaving machine the completed mat passes between the trimming saws or knives 30, these members being knives if the mat material is tule or similar soft grass or saws if the material used is willow, bamboo or the like and requires greater effort to trim it. After passing the knives, the completed mat passes on to the conveyor belt 41 which moves at approximately the same speed as the mat is fed from the weaving units. When the end of the completed mat reaches the conveyor belts 43, the upward movement of these belts tend to bend the mat about an arc. This is particularly true where the binding means is wire, for once the wire is bent, it tends to retain this form so that the end of the mat does not climb very high upon the conveyor 43 before it falls over upon itself forming a roll as shown in Fig. 11, whereupon continued action of the machine increases the diameter of the roll.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what

I claim as new and desire to secure by Letters Patent is:

1. In a mat weaving machine, a plurality of co-axially disposed weaving members substantially helicoidal in form, and bobbins carried by the one ends of said weaving members.

2. In a mat weaving machine, a plurality of co-axially disposed weaving members substantially helicoidal in form, bobbins carried by the one ends of said weaving members, and a supporting table disposed longitudinally with said weaving members and provided with slots therein for receiving the convolutions of said weaving members and said bobbins.

3. In a mat weaving machine, a plurality of weaving members substantially helicoidal in form, one end of each weaving member being enlarged forming a casing, and a bobbin arranged to fit in said casing.

4. In a mat weaving machine, a table, and a plurality of weaving members substantially helicoidal in form, projecting partially through said table with their axes in substantially parallel disposed relation with the plane of said table, there being provided openings in said table for receiving said weaving members.

5. In a mat weaving machine, a table, a plurality of weaving members substantially helicoidal in form, projecting partially through said table with their axes in substantially parallel disposed relation with the plane of said table, there being provided openings in said table for receiving said weaving members, one end of each weaving member being enlarged forming a casing, and a bobbin arranged to fit therein.

6. In a mat weaving machine, a table, a plurality of weaving members substantially helicoidal in form, projecting partially through said table with their axes in substantially parallel disposed relation with the plane of said table, there being provided openings in said table for receiving said weaving members, one end of each weaving member being enlarged forming a casing, a bobbin arranged to fit therein, means arranged below said table for revolubly supporting said weaving members about fixed axes, and driving means also below said table for rotating said weaving members.

7. In a mat making structure, a plurality of co-axially disposed weaving members substantially helicoidal in form, said weaving members forming a multiple pitch screw, the convolutions of said weaving members being spaced apart, a casing formed at one end of each weaving member, and a bobbin arranged to fit therein.

8. In a mat making structure, a table, a plurality of co-axially disposed weaving members substantially helicoidal in form, said weaving members forming a multiple pitch screw, the convolutions of said weaving members being spaced apart, said weaving members projecting partly through said table with their axes in substantially parallel disposed relation with the plane of said table, a casing formed at one end of each weaving member, and a bobbin arranged to fit therein.

9. In a mat making structure, a table, a plurality of co-axially disposed weaving members substantially helicoidal in form, said weaving members forming a multiple pitch screw, the convolutions of said weaving members being spaced apart, said weaving members projecting partly through said table with their axes in substantially parallel disposed relation with the plane of said table, a casing formed at one end of each weaving member, a bobbin arranged to fit therein, rollers disposed below said table and engageable with the convolutions of weaving members, arranged to rotatably support said weaving members about a fixed axis, and a driving drum including a helical channel pitched to receive adjacent convolutions of the multiple pitch screw formed by said weaving members, and intermeshing means connecting said drum with said weaving members whereby said weaving members rotate in positively synchronized relation with said driving drum.

10. In a mat weaving machine, a plurality of weaving members substantially helicoidal in form, one end of each weaving member being enlarged forming a casing, a bobbin arranged to fit in said casing, and a pair of screw conveyors their one ends arranged in contiguous relation, and diverging therefrom towards said weaving members, the pitches of said screw conveyors being such that upon rotation of said conveyors so as to feed towards said weaving members, the upper portions thereof rotate outwardly or away from each other.

11. In a mat weaving machine, a table, a plurality of weaving members substantially helicoidal in form, projecting partially through said table with their axes in substantially parallel disposed relation with the plane of said table, there being provided openings in said table for receiving said weaving members one end of each weaving member being enlarged forming a casing, a bobbin arranged to fit therein, and a pair of screw conveyors their one ends arranged in contiguous relation, and diverging therefrom towards said weaving members, said conveyors projecting partly through said table with their axes approximately parallel therewith, the pitches of said screw conveyors being such that upon rotation of said conveyors so as to feed towards said weaving members, the portions thereof exposed above said table rotate outwardly or away from each other.

12. In a mat weaving machine, a table, a plurality of weaving members substantially helicoidal in form projecting partially through said table with their axes in substantially parallel disposed relation with the plane of said table, there being provided openings in said table for receiving said weaving members, one end of each weaving member being enlarged forming a casing, a bobbin arranged to fit therein, means arranged below said table for revolubly supporting said weaving members about fixed axes, a driving means also below said table for rotating said weaving members, and a feeding mechanism including a pair of screw conveyors, their one ends arranged in contiguous relation, and diverging therefrom towards said weaving members, said conveyors projecting partly through said table with their axes approximately parallel therewith, the pitches of said screw conveyors being such that upon rotation of said conveyors so as to feed towards said weaving members, the portions thereof exposed above said table rotate outwardly or away from each other, and driving mechanism arranged to synchronize the movements of said conveyors, with each other and with said weaving members.

13. In a mat weaving machine, a table, a plurality of weaving members substantially helicoidal in form projecting partially through said table with their axes in substantially parallel disposed relation with the plane of said table, there being provided openings in said table for receiving said weaving members, one end of each weaving member being enlarged forming a casing, a bobbin arranged to fit therein, means arranged below said table for revolubly supporting said weaving members about fixed axes, a driving means also below said table for rotating said weaving members, and a feeding mechanism including a pair of screw conveyors, their one ends arranged in contiguous relation and diverging therefrom towards said weaving members, said conveyors projecting partly through said table with their axes approximately parallel therewith, the pitches of said screw conveyors being such that upon rotation of said conveyors so as to feed towards said weaving members, the portions thereof exposed above said table rotate outwardly or away from each other, a driving mechanism arranged to synchronize the movements of said conveyors, with each other and with said weaving members, and auxiliary conveyor mechanism arranged between said screw conveyors for assisting the action thereof.

14. In a mat weaving machine, a table, a plurality of weaving members substantially helicoidal in form, projecting partially through said table with their axes in substantially parallel disposed relation with the plane of said table, there being provided openings in said table for receiving said weaving members, one end of each weaving member being enlarged forming a casing, a bobbin arranged to fit therein, and a yieldable retaining means arranged to hold material being acted upon by said weaving members against said table.

15. In a mat making structure, a table, a plurality of co-axially disposed weaving members substantially helicoidal in form, said weaving members forming a multiple pitch screw, the convolutions of said weaving members being spaced apart, said weaving members projecting partly through said table with their axes in substantially parallel disposed relation with the plane of said table, a casing formed at one end of each weaving member, a bobbin arranged to fit therein, rollers disposed below said table and engageable with the convolutions of weaving members, arranged to rotatably support said weaving members about a fixed axis, and a driving drum including a helical channel pitched to receive adjacent convolutions of the multiple pitch screw formed by said weaving members, intermeshing means connecting said drum with said weaving members whereby said weaving members rotate in positively synchronized relation with said driving drum, and a feeding mechanism including a pair of screw conveyors, their one ends arranged in contiguous relation, and diverging therefrom towards said weaving members, said conveyors projecting partly through said table with their axes approximately parallel therewith, the pitches of said screw conveyors being such that, upon rotation of said conveyors so as to feed towards said weaving members, the portions thereof exposed above said table rotate outwardly or away from each other, driving mechanism arranged to synchronize the movements of said conveyors with each other and with said weaving members, and a yieldable retaining means arranged to hold material against said table while being acted upon by said conveyors and said weaving members.

16. In a machine of the class described, a plurality of weaving units arranged side by side and a pair of screw conveyor members arranged to receive mat material across their upper sides and feed the same to said weaving units, said conveyor members arranged with their one ends contiguous and diverging therefrom towards said weaving units, the pitch of said screw conveyors being such that upon rotation of said conveyors so as to feed towards said weaving units, the upper portions of said conveyors rotate outwardly or away from each other, the magnitude of the pitch of said screw conveyors being similar whereby mat material once disposed of thereupon moves equally throughout its length so as to feed simultaneously into said weaving units.

17. In a mat weaving machine, a plurality of weaving units arranged side by side with their axes in parallel disposed relation, each weaving unit including a plurality of co-axially disposed weaving members of substantially helicoidal form, a casing for each weaving member arranged at one end thereof, and a bobbin arranged to fit in said casing, the convolutions of said weaving members being spaced apart, the ends of said weaving members opposite from said bobbins forming fingers arranged to pass over a bundle of mat material fed to said weaving members, and a table extending axially with respect to said weaving units, said weaving units projecting partially therethrough.

18. In a mat weaving machine, a plurality of weaving units arranged side by side with their axes in parallel disposed relation, each weaving unit including a plurality of co-axially disposed weaving members of substantially helicoidal form, a casing for each weaving member arranged at one end thereof, and a bobbin arranged to fit in said casing, the convolutions of said weaving members being spaced apart, the ends of said weaving members opposite from said bobbins forming fingers arranged to pass over a bundle of mat material fed to said weaving members, a table extending axially with respect to said weaving units, said weaving units projecting partially therethrough, a pair of screw conveyors for feeding mat material to said weaving units their one ends arranged in contiguous relation and diverging therefrom towards said weaving units, said screw conveyors projecting partially through said table, the pitch of said screw conveyors being such that upon rotation thereof so as to feed towards said weaving units, the portions of said conveyors above said table rotate outwardly or away from each other, the magnitude of the pitch of said conveyors being similar whereby mat material once disposed thereon its fed into said weaving units simultaneously, and driving mechanism arranged below said table for driving said screw conveyors and weaving units in synchronous relation.

19. In a mat weaving machine, a plurality of weaving units arranged side by side with their axes in parallel disposed relation, each weaving unit including a plurality of co-axially disposed weaving members of substantially helicoidal form, a casing for each weaving member arranged at one end thereof, and a bobbin arranged to fit in said casing, the convolutions of said weaving members being spaced apart, the ends of said weaving members opposite from said bobbins forming fingers arranged to pass over a bundle of mat material fed to said weaving members, a table extending axially with respect to said weaving units, said weaving units projecting partially therethrough, a pair of screw conveyors for feeding mat material to said weaving units their one ends arranged in contiguous relation and diverging therefrom towards said weaving units, said screw conveyors projecting partially through said table, the pitch of said screw conveyors being such that upon rotation thereof so as to feed towards said weaving units, the portions of said conveyors above said table rotate outwardly or away from each other, the magnitude of the pitch of said conveyors being similar whereby mat material once disposed thereon is fed into said weaving units simultaneously and driving mechanism arranged below said table for driving said screw conveyors and weaving units in synchronous relation, and a yieldable retaining means arranged over said table for maintaining mat material against said table.

20. In a mat weaving machine, a plurality of weaving members substantially helicoidal in form, one end of each weaving member being enlarged forming a casing, a bobbin arranged to fit in said casing, a pair of screw conveyors their one ends arranged in contiguous relation, and diverging therefrom towards said weaving members, the pitches of said screw conveyors being such that upon rotation of said conveyors so as to feed towards said weaving members, the upper portions thereof rotate outwardly or away from each other, and a pair of conveyor mechanisms disposed at the discharge ends of said weaving members arranged to receive a mat woven by said weaving members and coil said mat.

In testimony whereof, I have hereunto set my hand at San Diego, California this 24th day of April, 1931.

ELA J. TUCKER.